US012587100B2

(12) United States Patent
Kanomata et al.

(10) Patent No.: US 12,587,100 B2
(45) Date of Patent: Mar. 24, 2026

(54) POWER CONVERSION DEVICE AND CONTROL METHOD THEREOF

(71) Applicant: Panasonic Intellectual Property Management Co., Ltd., Osaka (JP)

(72) Inventors: Ryusuke Kanomata, Osaka (JP); Shinji Ujita, Osaka (JP); Kenichiro Tanaka, Hyogo (JP); Takeshi Nakayashiki, Osaka (JP); Takayuki Hirokawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 18/713,089

(22) PCT Filed: Sep. 27, 2022

(86) PCT No.: PCT/JP2022/036012
§ 371 (c)(1),
(2) Date: May 23, 2024

(87) PCT Pub. No.: WO2023/105896
PCT Pub. Date: Jun. 15, 2023

(65) Prior Publication Data
US 2025/0030345 A1      Jan. 23, 2025

(30) Foreign Application Priority Data

Dec. 10, 2021      (JP) ................................. 2021-200888

(51) Int. Cl.
*H02M 3/158* (2006.01)
*H02M 1/00* (2007.01)
(52) U.S. Cl.
CPC ....... *H02M 3/1588* (2013.01); *H02M 1/0009* (2021.05); *H02M 1/0058* (2021.05)

(58) Field of Classification Search
CPC . H02M 1/0009; H02M 1/0058; H02M 3/1588
See application file for complete search history.

(56) References Cited

U.S. PATENT DOCUMENTS

| | | | | |
|---|---|---|---|---|
| 7,598,715 | B1 * | 10/2009 | Hariman ............. | H02M 3/1588 323/222 |
| 2014/0347028 | A1 * | 11/2014 | Jayaraj ................ | H02M 3/1588 323/282 |
| 2023/0308018 | A1 * | 9/2023 | Chang ................... | H02M 3/156 |

FOREIGN PATENT DOCUMENTS

| | | |
|---|---|---|
| JP | 2017-505097 A | 2/2017 |
| JP | 6529045 B2 | 5/2019 |
| WO | 2015/095699 A1 | 6/2015 |

OTHER PUBLICATIONS

International Search Report dated Dec. 13, 2022 issued in International Patent Application No. PCT/JP2022/036012, with English translation.

* cited by examiner

*Primary Examiner* — Jue Zhang
(74) *Attorney, Agent, or Firm* — Rimon P.C.

(57) ABSTRACT

The power conversion device can undergo autonomous search control for ZVS without a larger circuit area or lower reliability. The power conversion device performs, in each switching cycle, an operation of turning the control switch (CTLSW) on and afterward off while the synchronous rectification switch (SRSW) is off, and then turning the synchronous rectification switch on and afterward off while the control switch is off. Whether the inductor current ($i_L$) is positive or negative is detected at the detection timing backed by a predetermined period ($T_{ext}$) from a timing at which the synchronous rectification switch switches from on to off, based on the detection result, the on-period ($T_{OFF}$) of the synchronous rectification switch is corrected.

12 Claims, 15 Drawing Sheets

NEGATIVE CURRENT APPROPRIATE AT T1
⇒ IDEAL ZVS

━━━━ REALITY = IDEAL OPERATION

NEGATIVE CURRENT INSUFFICIENT AT T1
⇒ RESONANCE ENERGY INSUFFICIENT, THUS ZVS
UNABLE TO BE PERFORMED

━ ‥ ━ IDEAL OPERATION

━━━━ REALITY

NEGATIVE CURRENT EXCESSIVE AT T1
⇒ EFFICIENCY REDUCED

━ ‥ ━ IDEAL OPERATION

━━━━ REALITY

Figure 5:
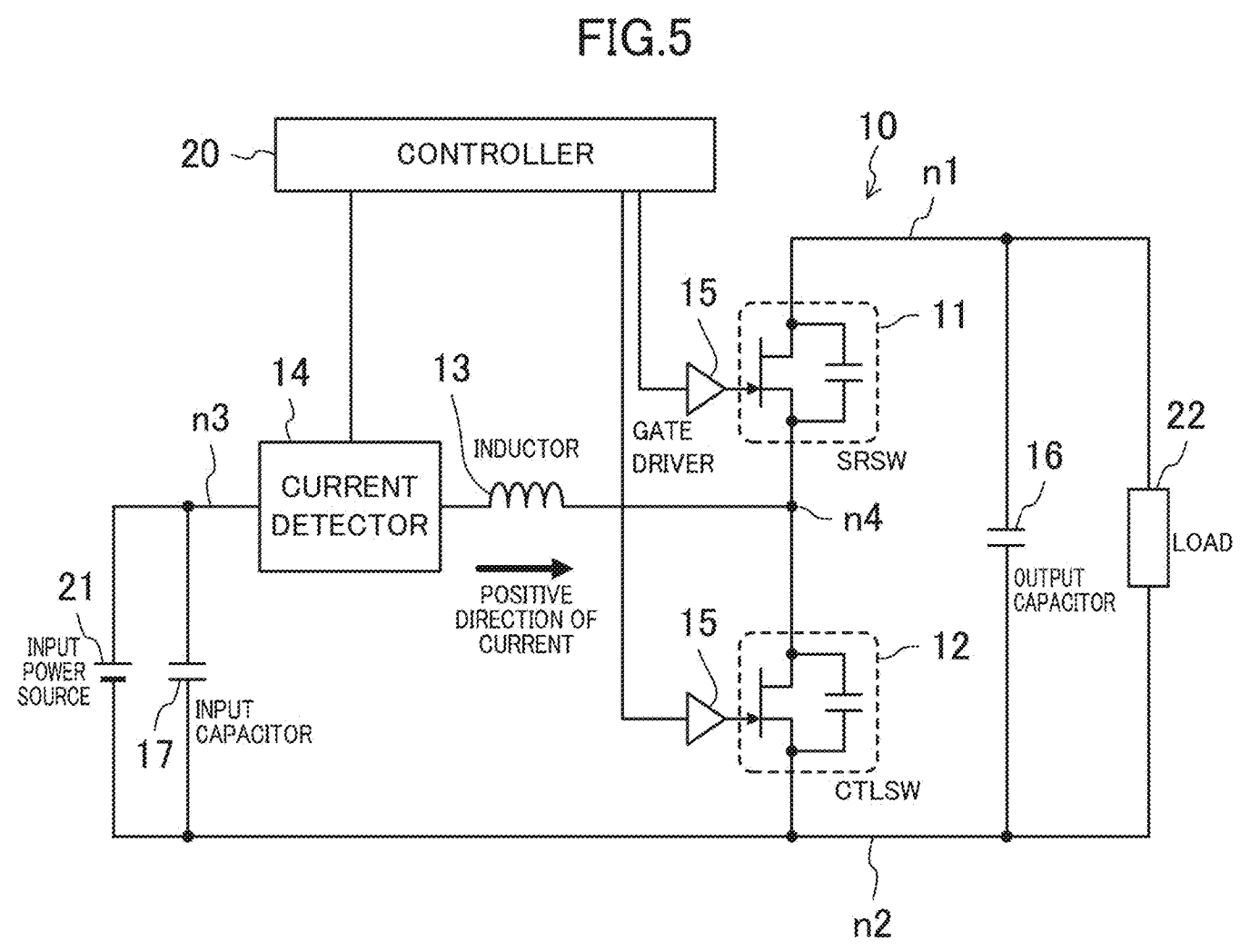

SRSW

15

GATE
DRIVER n4

12

CTLSW

15 n2

CONTROLLER

20

13

INDUCTOR

POSITIVE
DIRECTION OF
CURRENT

14

CURRENT
DETECTOR n3

17

INPUT
CAPACITOR

21

INPUT
POWER
SOURCE

16

OUTPUT
CAPACITOR

22

LOAD

FIG.7A

OPERATION IN ONE SWITCHING CYCLE

| step | TITLE | CTLSW | SRSW | STATE/DETECTION OPERATION |
|---|---|---|---|---|
| ① | Ton | ON | OFF | CURRENT IN POSITIVE DIRECTION FLOWS IN INDUCTOR L |
| ↓ | – | TURN OFF | ↓ | |
| ② | Tdbfed | OFF | OFF | V(DS_CTL) INCREASES TO V(OUT) DUE TO RESONANCE |
| ↓ | – | ↓ | TURN ON | |
| ③ | Toff | OFF | ON | CURRENT IN POSITIVE DIRECTION FLOWS IN INDUCTOR L |
| ↓ | – | ↓ | ↓ | DETECT WHETHER INDUCTOR CURRENT IS POSITIVE OR NEGATIVE WHEN PERIOD (3) IS ENDED |
| ④ | Text | OFF | ON | CURRENT IN NEGATIVE DIRECTION FLOWS IN INDUCTOR L |
| ↓ | – | ↓ | TURN OFF | |
| ⑤ | Tdbred | OFF | OFF | V(DS_CTL) DECREASES TO ZERO DUE TO RESONANCE |
| ↓ | – | TURN ON | ↓ | |
| ⑥ | Textoff | ON | OFF | CURRENT IN NEGATIVE DIRECTION FLOWS IN INDUCTOR L |

FIG.7B

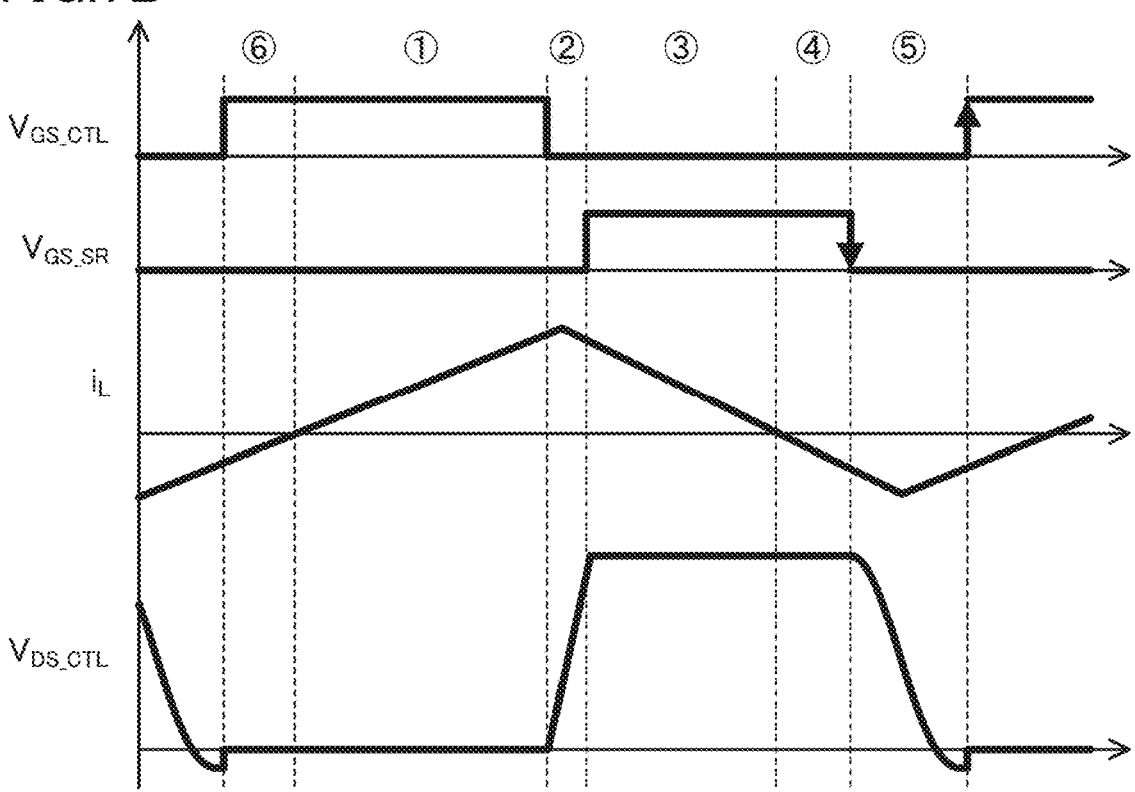

FIG.8

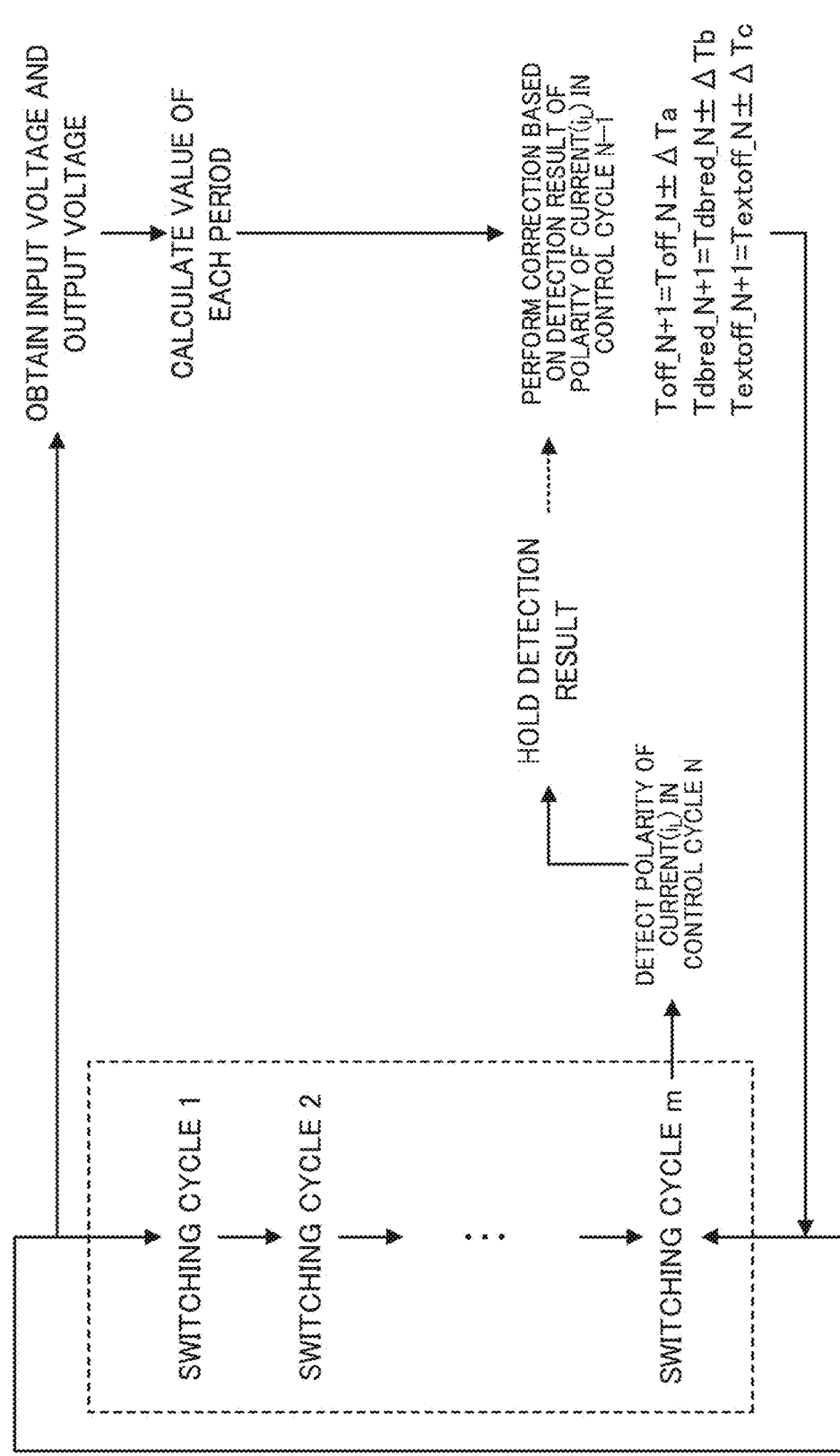

OPERATION IN ONE CONTROL CYCLE

OBTAIN INPUT VOLTAGE AND OUTPUT VOLTAGE

CALCULATE VALUE OF EACH PERIOD

PERFORM CORRECTION BASED ON DETECTION RESULT OF POLARITY OF CURRENT($i_L$) IN CONTROL CYCLE N−1

$Toff\_N+1=Toff\_N\pm\Delta Ta$
$Tdbred\_N+1=Tdbred\_N\pm\Delta Tb$
$Textoff\_N+1=Textoff\_N\pm\Delta Tc$

HOLD DETECTION RESULT

DETECT POLARITY OF CURRENT($i_L$) IN CONTROL CYCLE N

SWITCHING CYCLE 1

SWITCHING CYCLE 2

· · ·

SWITCHING CYCLE m

FIG.11

OPERATION IN ONE SWITCHING CYCLE (FIRST PHASE, STEP-UP RATE > 0.5)

| step | TITLE | CTLSW | SRSW | STATE/DETECTION OPERATION |
|---|---|---|---|---|
| ① | Ton | ON | OFF | CURRENT IN POSITIVE DIRECTION FLOWS IN INDUCTOR L ⇒ INCLINATION OF CURRENT INCREASE IN PERIOD (1) MAY VARY WITH DIRECTION OF INDUCTOR CURRENT IN SECOND PHASE (CHANGE IS FOUND IN EXAMPLE OF FIG. 10) |
| ↓ | – | TURN OFF | ↓ | |
| ② | Tdbfed | OFF | OFF | V(DS_CTL) INCREASES TO V(OUT) DUE TO RESONANCE |
| ↓ | – | ↓ | TURN ON | |
| ③ | Toff | OFF | ON | CURRENT IN POSITIVE DIRECTION FLOWS IN INDUCTOR L |
| ↓ | – | ↓ | ↓ | DETECT WHETHER INDUCTOR CURRENT IS POSITIVE OR NEGATIVE WHEN PERIOD (3) IS ENDED |
| ④ | Text | OFF | ON | CURRENT IN NEGATIVE DIRECTION FLOWS IN INDUCTOR L |
| ↓ | – | ↓ | TURN OFF | |
| ⑤ | Tdbred | OFF | OFF | V(DS_CTL) DECREASES TO ZERO DUE TO RESONANCE |
| ↓ | – | TURN ON | ↓ | |
| ⑥ | Textoff | ON | OFF | CURRENT IN NEGATIVE DIRECTION FLOWS IN INDUCTOR L ⇒ INCLINATION OF CURRENT INCREASE IN PERIOD (6) MAY VARY WITH DIRECTION OF INDUCTOR CURRENT IN SECOND PHASE (NO CHANGE IS FOUND IN EXAMPLE OF FIG. 10) |

| POLARITY OF AC INPUT POWER SOURCE | | ASSIGNMENT OF CTLSW/SRSW TO SW1 AND SW2 | | SWITCHING ON/OFF OF SW3 AND SW4 | |
|---|---|---|---|---|---|
| L | N | SW1 | SW2 | SW3 | SW4 |
| POSITIVE | NEGATIVE | CTLSW | SRSW | ON | OFF |
| NEGATIVE | POSITIVE | SRSW | CTLSW | OFF | ON |

FIG.14B

| POLARITY OF AC INPUT POWER SOURCE | | POSITIVE DIRECTION OF INDUCTOR CURRENT |
|---|---|---|
| L | N | |
| POSITIVE | NEGATIVE | DIRECTION OF SOLID LINE |
| NEGATIVE | POSITIVE | DIRECTION OF BROKEN LINE |

| POLARITY OF AC OUTPUT VOLTAGE | | ASSIGNMENT OF CTLSW/SRSW TO SW1 AND SW2 | | SWITCHING ON/OFF OF SW3 AND SW4 | |
|---|---|---|---|---|---|
| L | N | SW1 | SW2 | SW3 | SW4 |
| POSITIVE | NEGATIVE | SRSW | CTLSW | ON | OFF |
| NEGATIVE | POSITIVE | CTLSW | SRSW | OFF | ON |

FIG.16B

| POLARITY OF AC OUTPUT VOLTAGE | | POSITIVE DIRECTION OF INDUCTOR CURRENT |
|---|---|---|
| L | N | |
| POSITIVE | NEGATIVE | DIRECTION OF BROKEN LINE |
| NEGATIVE | POSITIVE | DIRECTION OF SOLID LINE |

POWER CONVERSION DEVICE AND CONTROL METHOD THEREOF

CROSS-REFERENCE OF RELATED APPLICATIONS

This application is the U.S. National Phase under 35 U.S.C. § 371 of International Patent Application No. PCT/JP2022/036012, filed on Sep. 27, 2022, which in turn claims the benefit of Japanese Patent Application No. 2021-200888, filed on Dec. 10, 2021, the entire disclosures of which Applications are incorporated by reference herein.

TECHNICAL FIELD

The present disclosure relates to control of a power conversion device such as a boost converter.

BACKGROUND ART

In typical power conversion devices such as Boost converters, zero-voltage switching (ZVS) is implemented. In a circuit configuration including a synchronous rectification switch (SRSW), a control switch (CTLSW), and an inductor, the ZVS is implemented by a resonance phenomenon being yielded between the parasitic capacitance of the CTLSW and the inductor, where a resonance period is a dead time between when the SRSW turns off and when the CTLSW turns on. By application of a negative current to the inductor, the amplitude of the resonance voltage can be increased, and the drain-source voltage $V_{DS\_CTL}$ of the CTLSW can reach 0V. Accordingly, the ZVS can be implemented.

For a power conversion device to perform a stable operation with high efficiency, it is necessary to optimize the negative current described above. As a control technique for this end, a technique based on autonomous search control has been proposed. The autonomous search control herein is a technique of detecting a characteristic part of a waveform indicating a circuit operation and performing control based on the detected timing.

In Patent Document 1, calculation figures of on/off periods of a CTLSW and an SRSW in each switching cycle are determined. Then, it is detected whether a drain-source voltage $V_{DS\_CTL}$ of the CTLSW becomes a predetermined threshold value or less during a predetermined period in one switching cycle. Then, based on the detection result, an on-period of the SRSW is optimized step by step by correction.

CITATION LIST

Patent Document

Patent Document 1: Japanese Translation of PCT International Application No. 2017-505097

SUMMARY OF THE INVENTION

Technical Problem

However, the technique of Patent Document 1 has the following problems. Namely, while it is necessary to provide a voltage detection circuit to detect a drain-source voltage $V_{DS\_CTL}$ of the CTLSW, it is also necessary to clamp a voltage at a high speed. It is thus necessary to provide a voltage detection circuit having a large number of components. Further, in a device such as a totem pole PFC converter, a CTLSW and an SRSW swap positions with each when assigned, and both of the switches are required to have a voltage detection circuit. Accordingly, the power conversion device requires a larger circuit area. Further, the voltage detection circuit detects steeply fluctuating voltages, and are susceptible to noise attributed to the voltage fluctuation itself.

In view of the foregoing, it is an object of the present disclosure for a power conversion device to undergo autonomous search control for ZVS without a larger circuit area or lower reliability due to a noise effect.

Solution to the Problem

A power conversion device of one aspect of the present disclosure includes a main circuit unit configured to perform a step-up operation or a step-down operation; and a controller configured to control an operation of the main circuit unit, wherein the main circuit unit includes a first switch and a second switch connected in series between a first node and a second node, an inductor connected between a third node and a connection node of the first and second switches, and a current detector configured to detect whether a current flowing in the inductor is positive or negative; the controller is configured to define one of the first and second switches as a synchronous rectification switch, define the other one of the first and second switches as a control switch, and define a positive direction of an inductor current, perform, in each switching cycle, an operation of turning the control switch on and afterward off while the synchronous rectification switch is off, and then turning the synchronous rectification switch on and afterward off while the control switch is off, obtain, in a first switching cycle, a detection result from the current detector at a detection timing backed by a predetermined period from a timing at which the synchronous rectification switch switches from on to off, and correct, based on whether the inductor current is positive or negative indicated by the detection result, an on-period of the synchronous rectification switch in a second switching cycle after the first switching cycle.

Advantages of the Invention

According to the present disclosure, the power conversion device can undergo autonomous search control for ZVS without a larger circuit area or lower reliability due to a noise effect.

BRIEF DESCRIPTION OF THE DRAWINGS

FIG. 5 shows an exemplary configuration of a power conversion device of Example 1.

FIGS. 7A and 7B show an operation of a power conversion device of Example 1 in one switching cycle.

FIG. 8 shows an operation of a power conversion device of Example 1 in one control cycle.

FIG. 11 shows an operation of the power conversion device of Example 1-1 in one switching cycle.

FIG. 12 shows an exemplary configuration of a power conversion device of Example 2.

FIG. 13 shows an exemplary configuration of a power conversion device of Example 3.

FIGS. 14A and 14B show an operation of the power conversion device of Example 3.

FIG. 15 shows an exemplary configuration of a power conversion device of Example 4.

FIGS. 16A and 16B show an operation of the power conversion device of Example 4.

DESCRIPTION OF EMBODIMENTS

Overview

Figures 1, 2:
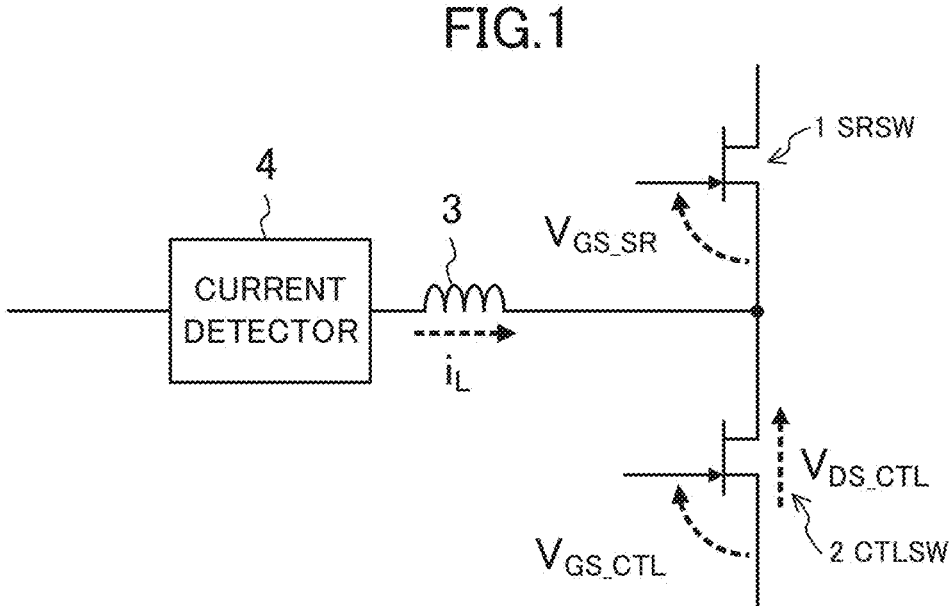
FIG. 1 shows an exemplary basic configuration of the present disclosure.
FIG. 2 shows a timing diagram showing an operation of the configuration in FIG. 1.

A power conversion device of one aspect of the present disclosure includes a main circuit unit configured to perform a step-up operation or a step-down operation; and a controller configured to control an operation of the main circuit unit, wherein the main circuit unit includes a first switch and a second switch connected in series between a first node and a second node, an inductor connected between a third node and a connection node of the first and second switches, and a current detector configured to detect whether a current flowing in the inductor is positive or negative; the controller is configured to define one of the first and second switches as a synchronous rectification switch, define the other one of the first and second switches as a control switch, and define a positive direction of an inductor current, perform, in each switching cycle, an operation of turning the control switch on and afterward off while the synchronous rectification switch is off, and then turning the synchronous rectification switch on and afterward off while the control switch is off, obtain, in a first switching cycle, a detection result from the current detector at a detection timing backed by a predetermined period from a timing at which the synchronous rectification switch switches from on to off, and correct, based on whether the inductor current is positive or negative indicated by the detection result, an on-period of the synchronous rectification switch in a second switching cycle after the first switching cycle.

Accordingly, in a first switching cycle, whether the inductor current is positive or negative is detected by the current detector at a detection timing backed by a predetermined time from a timing at which the synchronous rectification switch switches from on to off. Based on whether the inductor current is positive or negative detected by the current detector, the on-period of the synchronous rectification switch in the second switching cycle is corrected. Therefore, autonomous search control for ZVS can be implemented without a larger circuit area or lower reliability due to a noise effect.

The controller may set, as the predetermined period, a period in which the inductor current is expected to become zero at the detection timing in an ideal operation state.

Accordingly, the detection timing of the inductor current can be set appropriately.

The controller may calculate the predetermined period using an input voltage value and an output voltage value of the power conversion device, an inductance value of the inductor, and a parasitic capacitance value of the first switch and a parasitic capacitance value of the second switch.

Accordingly, the predetermined period for defining the detection timing of the inductor current can be calculated appropriately.

The controller may lengthen the on-period of the synchronous rectification switch when the detection result indicates that the inductor current is positive, and may shorten the on-period of the synchronous rectification switch when the detection result indicates that the inductor current is negative.

Accordingly, the on-period of the synchronous rectification switch can be corrected appropriately.

When correcting the on-period of the synchronous rectification switch, the controller may correct the on-period of the control switch according to the correction to the on-period of the synchronous rectification switch.

Accordingly, when the on-period of the synchronous rectification switch is corrected, the ratio between the on-period of the control switch and the on-period of the synchronous rectification switch can be maintained appropriately.

When correcting the on-period of the synchronous rectification switch, the controller may correct the period between when the synchronous rectification switch is turned off and when the control switch is turned on, according to the correction to the on-period of the synchronous rectification switch.

Accordingly, the resonance period can be maintained in an appropriate state.

The current detector may include a shunt resistor connected in series with the inductor, and is configured to detect whether the inductor current is positive or negative based on a voltage at both ends of the shunt resistor.

Accordingly, a current detection can be performed with high noise resistance.

The second switching cycle may be a cycle immediately after the first switching cycle.

Accordingly, the response speed can be made higher.

The controller may perform an operation according to a control cycle including m switching cycles, where m is an integer greater than or equal to 1; obtain, in any switching cycle in a first control cycle, a detection result from the current detector at the detection timing; and correct, based on whether the inductor current is positive or negative indicated by the detection result, the on-period of the synchronous rectification switch in a second control cycle after the first control cycle.

Accordingly, a correction can be performed where the control cycle is the unit of operation.

The second control cycle may be a control cycle immediately after the first control cycle.

Accordingly, the response speed can be made higher.

The second control cycle may be a control cycle next to the control cycle immediately after the first control cycle, or another control cycle thereafter.

Accordingly, a sufficient amount of time for calculation can be secured.

In a control method of a power conversion device of one aspect of the present disclosure, the power conversion device includes a main circuit unit configured to perform a step-up operation or a step-down operation, and the main circuit unit includes a first switch and a second switch connected in series between a first node and a second node, an inductor connected between a third node and a connection node of the first and second switches, and a current detector configured to detect whether a current flowing in the inductor is positive or negative, the control method includes defining one of the first and second switches as a synchronous rectification switch, defining the other one of the first and second switches as a control switch, and defining a positive direction of an inductor current, performing, in each switching cycle, an operation of turning the control switch on and afterward off while the synchronous rectification switch is off, and then turning the synchronous rectification switch on and afterward off while the control switch is off, obtaining, in a first switching cycle, a detection result from the current detector at a detection timing backed by a predetermined period from a timing at which the synchronous rectification switch switches from on to off, and correcting, based on whether the inductor current is positive or negative indicated by the detection result, an on-period of the synchronous rectification switch in a second switching cycle after the first switching cycle.

Accordingly, in a first switching cycle, whether the inductor current is positive or negative is detected by the current detector at a detection timing backed by a predetermined time from a timing at which the synchronous rectification switch switches from on to off. Based on whether the inductor current is positive or negative detected by the current detector, the on-period of the synchronous rectification switch in the second switching cycle is corrected. Therefore, autonomous search control for ZVS can be implemented without a larger circuit area or lower reliability due to a noise effect.

Embodiments will be now described in detail with reference to the drawings. Unnecessarily detailed description may be omitted. For example, detailed description of already well-known matters or repeated description of substantially the same configurations may be omitted. This is to reduce unnecessary redundancy of the following description and to facilitate the understanding by those skilled in the art.

The accompanying drawings and the following description are provided for sufficient understanding of the present disclosure by those skilled in the art, and are not intended to limit the subject matter of the claims.

Embodiment

An approach of the present disclosure will be described with reference to FIGS. 1 to 4.

FIG. 1 shows an exemplary basic configuration of the present disclosure. In the configuration in FIG. 1, a synchronous rectification switch (hereinafter referred to as "SRSW" as appropriate) 1 and a control switch (hereinafter referred to as "CTLSW" as appropriate) 2 are connected in series. A connection node between the SRSW1 and the CTLSW2 is connected with one end of an inductor 3. A current detector (current detection circuit) 4 is provided to detect a current $i_L$ (hereinafter referred to as "inductor current" as appropriate) flowing in the inductor 3. The configuration in FIG. 1 is included in a power conversion device such as a Boost converter.

FIG. 2 is a timing diagram showing the operation of the configuration in FIG. 1. FIG. 2 shows changes with the lapse of time in a gate-source voltage $V_{GS\_CTL}$ of the CTLSW2, a gate-source voltage $V_{GS\_SR}$ of the SRSW1, a current $i_L$ flowing in the inductor 3, and a drain-source voltage $V_{DS\_CTL}$ of the CTLSW2.

In an existing autonomous search control method, the drain-source voltage $V_{DS\_CTL}$ of the CTLSW2 is detected, and based on this an on-period $T_{OFF}$ of the SRSW1 is corrected. In the present disclosure, instead of the voltage $V_{DS\_CTL}$, the current $i_L$ flowing in the inductor 3 is detected, and based on this the on-period $T_{OFF}$ of the SRSW1 is corrected.

The timing at which the inductor current $i_L$ is detected is a timing backed by a predetermined period $T_{ext}$ from a point at which the SRSW1 turns off. This detection timing is a timing at which the inductor current $i_L$ is expected to become zero in an ideal operation state. In order to obtain a target output voltage or output current, a controller calculates an on-period and an off-period of each switch and timings thereof to implement ideal ZVS based on an input voltage value, an output voltage value, and an average output current value obtained from each detector; and an inductance value determined in advance. The ideal operation state means that a virtual waveform is consistent with an actual waveform, where the virtual waveform is thought of as being produced with the calculated on-period, off-period, and timings thereof being corrected by an autonomous search control.

Figure 3A:
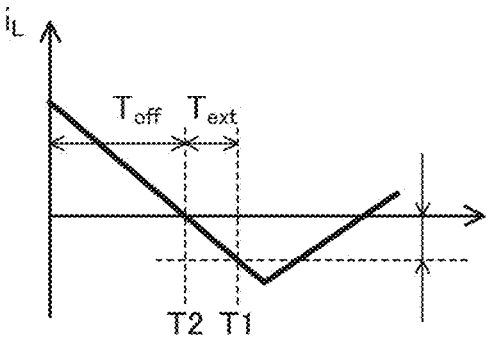
FIGS. 3A to 3C show exemplary changes in an inductor current.
Figure 3B:
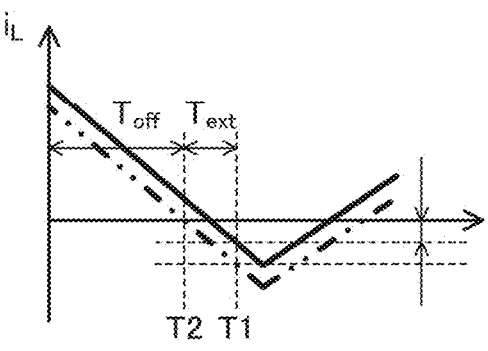
Figure 3C:
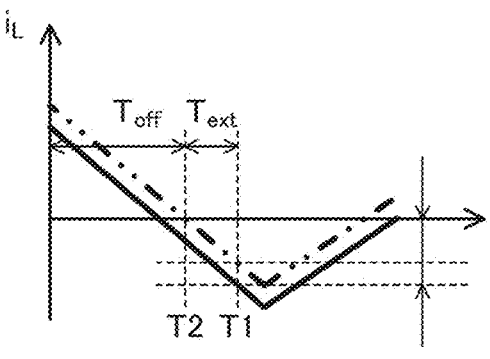

FIGS. 3A to 3C show exemplary changes in the inductor current $i_L$. In FIG. 3, a timing at which the SRSW1 turns off is defined as T1, and a detection timing backed from the timing T1 by a predetermined period $T_{ext}$ is defined as T2. As shown in FIG. 3A, when $i_L$=0 at the detection timing T2, negative current is appropriate at the timing T1, and the ideal ZVS can be implemented. In contrast, as shown in FIG. 3B, when $i_L$>0 at the detection timing T2, negative current is insufficient at the timing T1, such that the resonance energy is insufficient and the ZVS cannot be implemented. As shown in FIG. 3C, when $i_L$<0 at the detection timing T2, negative current is excessive at the timing T1, and the efficiency is reduced.

Figure 4:
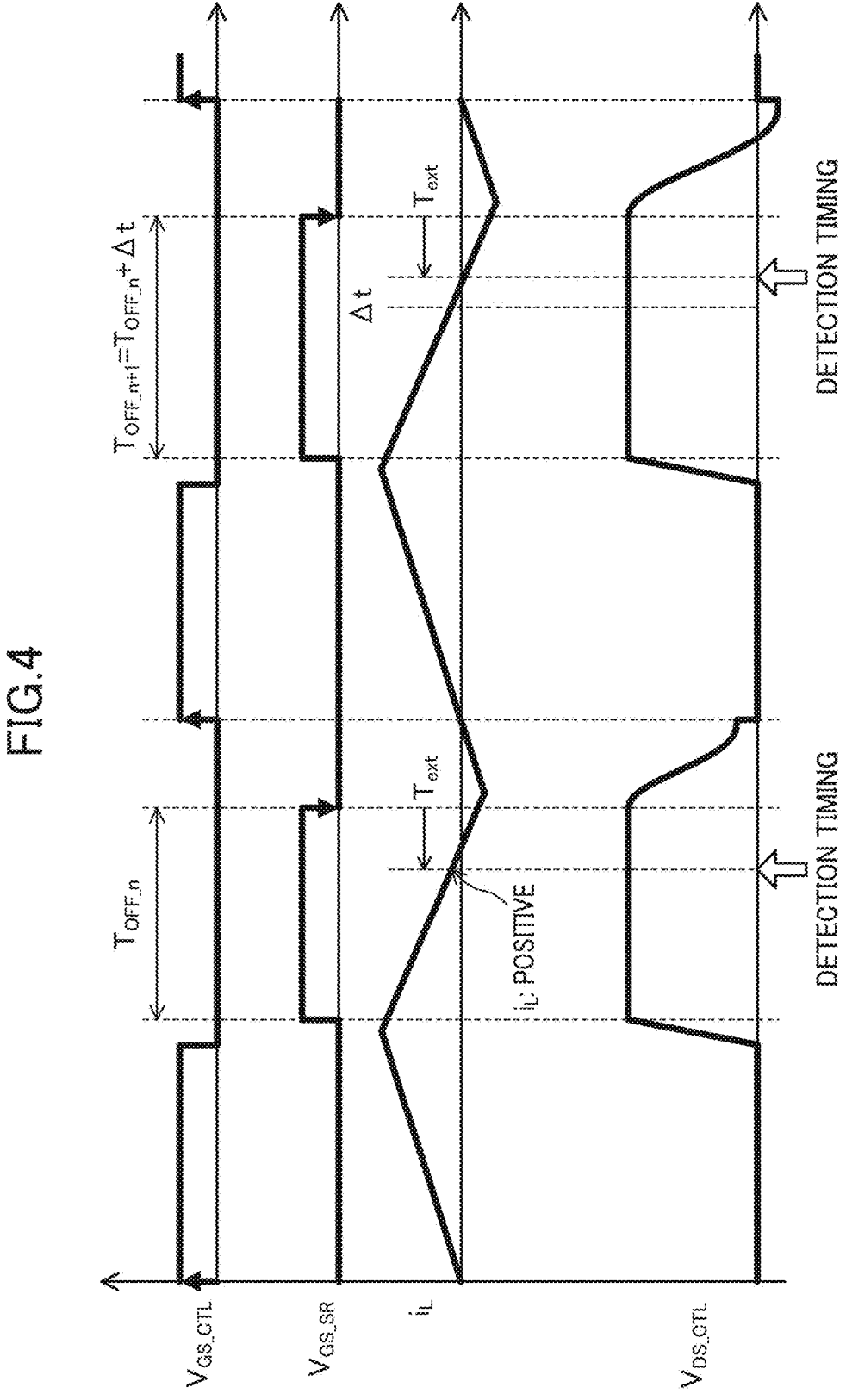
FIG. 4 shows an exemplary autonomous search control of the present disclosure.

FIG. 4 shows exemplary autonomous search control of the present disclosure. As shown in FIG. 4, when it is detected that the inductor current $i_L$ is positive at the detection timing, the period $T_{OFF}$ in which the SRSW1 is on is lengthened. In the example of FIG. 4, a correction value $\Delta t$ is added to a period $T_{OFF\_n}$ in a switching cycle so that a period $T_{OFF\_n+1}$ in the subsequent switching cycle is defined. In contrast, when it is detected that the inductor current $i_L$ is negative at the detection timing, the period $T_{OFF}$ in which the SRSW1 is on is shortened. For example, a correction value $\Delta t$ may be subtracted from a period $T_{OFF\_n}$ so that a period $T_{OFF\_n+1}$ in the subsequent switching cycle is defined.

In this manner, in the present disclosure, whether the current $i_L$ flowing in the inductor 3 is positive or negative (polarity) is detected at a timing at which the current $i_L$ is expected to become zero in the ideal operation state. Then, deviation from the ideal operation is corrected depending on whether the detected inductor current $i_L$ is positive or negative. That is, when the detected inductor current $i_L$ is positive, the period $T_{OFF}$ in which the CTLSW2 is off and the SRSW1 is on is lengthened. When the detected inductor current $i_L$ is negative, the period $T_{OFF}$ is shortened.

According to the present disclosure, the inductor current detection has advantages in the circuit scale and the reliability compared to the voltage detection. That is, the current detector 4 only has to detect a direction of a current flowing in the inductor 3, and thus the circuit area is smaller than that of a voltage detection circuit. In addition, even such a device as a totem pole PFC converter where the CTLSW and the SRSW can be swapped only has to be provided with one single current detector. In addition, current fluctuation is gentler than voltage fluctuation, and noise is less likely to be superimposed during detection.

Therefore, according to the present disclosure, the power conversion device can undergo autonomous search control for ZVS without a larger circuit area or lower reliability due to a noise effect.

Specific examples of the configurations will be described below.

Example 1

FIG. 5 shows a specific exemplary configuration of a Boost converter (DCDC step-up converter) as a power conversion device of Example 1. As shown in FIG. 5, in a main circuit unit 10, a synchronous rectification switch (SRSW) 11 and a control switch (CTLSW) 12 are connected in series between a node n1 and a node n2. The SRSW 11 and the CTLSW 12 are transistors each having a gate terminal, a drain terminal, and a source terminal. The gate terminals of the SRSW 11 and the CTLSW 12 are each connected with a gate driver 15. An inductor 13 is connected between a node n3 and a connection node n4 of the SRSW 11 and the CTLSW 12. An output capacitor 16 is arranged between the node n1 and the node n2, and an input capacitor 17 is arranged between the node n3 and the node n2.

The controller 20 controls a switching operation of the SRSW 11 and the CTLSW 12 via the gate driver 15. The main circuit unit 10 is provided with a current detector 14 that detects the direction of a current in the inductor 13. The controller 20 obtains a detection result from the current detector 14 at a predetermined timing. Here, the positive direction of a current in the inductor 13 is the rightward direction in the drawing, i.e., the direction toward the connection node n4 of the SRSW 11 and the CTLSW 12. In FIG. 5, the current detector 14 is provided between the inductor 13 and the node n3, but the current detector 14 may be provided between the inductor 13 and the connection node n4. The same applies to the following examples.

An input power source 21 is connected between the node n3 and the node n2. A load 22 is connected between the node n1 and the node n2. Although not shown, an input voltage detector and an output voltage detector are provided, and the controller 20 obtains an input voltage value from the input voltage detector and an output voltage value from the output voltage detector.

Figure 6:
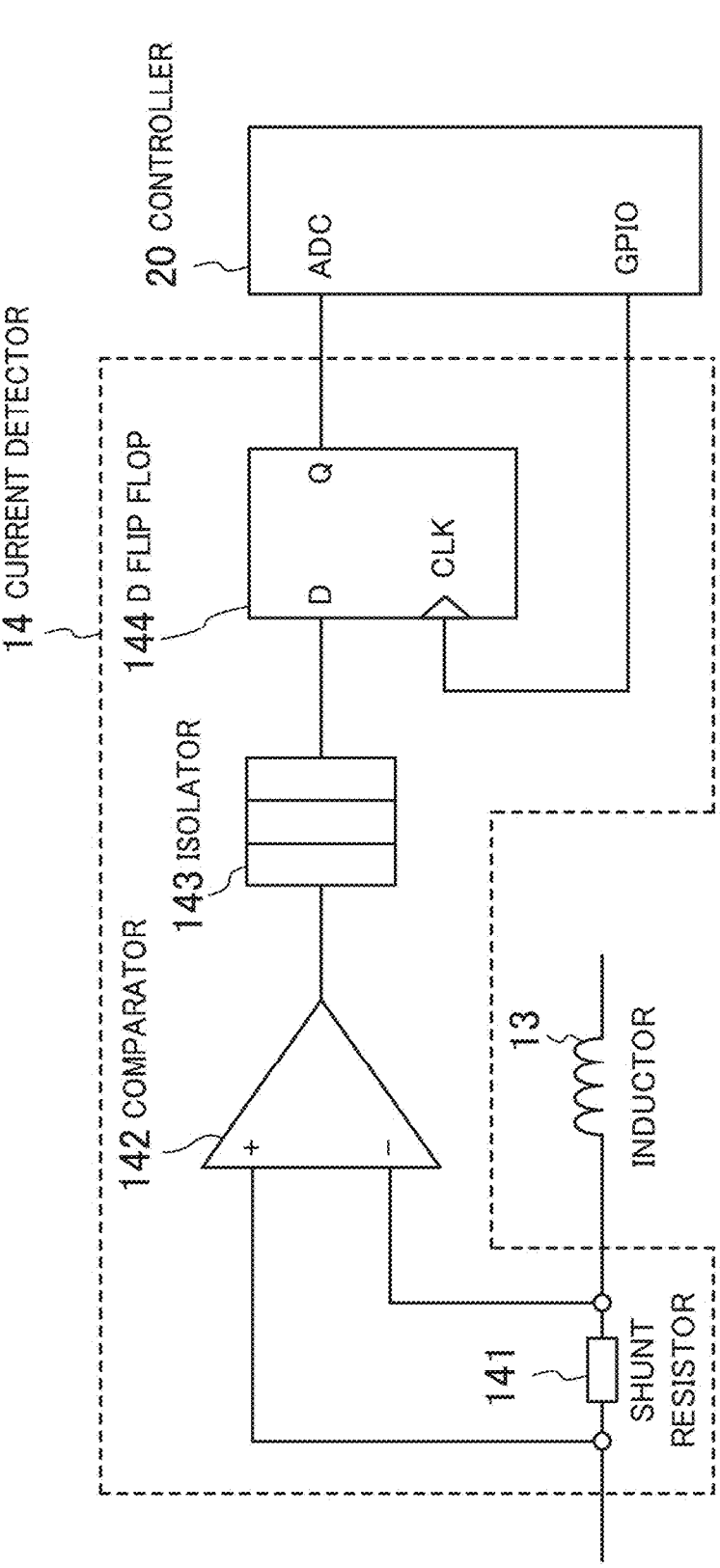
FIG. 6 shows an exemplary configuration of a current detector.

FIG. 6 shows a specific exemplary configuration of the current detector 14. In FIG. 6, the current detector 14 includes a shunt resistor 141 in series with the inductor 13, a comparator 142, an isolator 143, and a D flip flop 144. At both ends of the shunt resistor 141, a voltage is generated according to a current flowing in the inductor 13. The comparator 142 determines the direction of a voltage generated at both ends of the shunt resistor 14. The isolator 143 changes its reference potential for an output of the comparator 142 so that it can be processed by a signal system. The D flip flop 144 holds an output of the isolator 143 at a predetermined timing according to an instruction from the controller 20. The configuration of the current detector 14 is not limited to that shown in FIG. 6.

FIGS. 7A and 7B show an operation of the Boost converter in one switching cycle in the ideal operation state. The operation shown in FIG. 7 is achieved by the controller 20 controlling on/off of the SRSW 11 and the CTLSW 12. As shown in FIG. 7, in step (1), the CTLSW 12 is on, the SRSW 11 is off, and the current $i_L$ in the positive direction flows in the inductor 13 (period $T_{on}$). In the period $T_{on}$, the inductor current $i_L$ gradually increases, and the inductor 13 stores energy. In step (2), the CTLSW 12 is turned off, and after the drain-source voltage $V_{DS\_CTL}$ of the CTLSW 12 increases to the output voltage $V_{out}$ due to resonance, the SRSW 11 is turned on (period $T_{dbfed}$). In step (3), the CTLSW 12 is off, the SRSW 11 is on, and the current $i_L$ in the positive direction flows in the inductor 13 (period $T_{off}$). In the period $T_{off}$, the inductor current $i_L$ gradually decreases and power is transmitted to the output side. In step (4) following step (3), the current $i_L$ in the negative direction flows in the inductor 13, and the inductor 13 stores energy (period $T_{ext}$). In step (5), the SRSW 11 is turned off, and after the voltage $V_{DS\_CTL}$ decreases to zero due to resonance, the CTLSW 12 is turned on (period $T_{dbred}$). In step (6), the CTLSW 12 is on, the SRSW 11 is off, and the current $i_L$ in the negative direction flows in the inductor 13 (period $T_{extoff}$). In the period $T_{extoff}$, the inductor current $i_L$ flowing in the negative direction gradually decreases.

Then, at a timing at which step (3) is expected to be ended, the controller 20 confirms whether the current $i_L$ flowing in the inductor 13 is positive or negative detected by the current detector 14. The controller 20 sets this detection timing to a timing backed by a period $T_{ext}$ as a predetermined period from a timing at which the SRSW 11 switches from on to off (a timing at which step (4) is ended). The controller 20 sets, as a period $T_{ext}$, a period in which the inductor current is expected to become zero at the detection timing. For example, the controller 20 can theoretically calculate the period $T_{ext}$ using an input voltage value and an output voltage value of the Boost converter; an inductance value of the inductor 13; a parasitic capacitance value of the SRSW 11; and a parasitic capacitance value of the CTLSW12.

The controller 20 can calculate the period $T_{dbred}$ and the period $T_{extoff}$ based on the period $T_{ext}$; the cycle of resonance of the inductor 13 with the parasitic capacitances of the SRSW 11 and the CTLSW 12; the input voltage; and the difference between the input voltage and the output voltage.

Then, the controller 20 corrects deviation from the ideal operation depending on whether the detected inductor current $i_L$ is positive or negative. That is, when the detected inductor current $i_L$ is positive, the period in which the SRSW 11 is on is lengthened. When the detected inductor current $i_L$ is negative, the period in which the SRSW 11 is on is shortened.

FIG. 8 shows an operation of the Boost converter in one control cycle. In FIG. 8, in one control cycle, m switching cycles are performed (where m is an integer greater than or equal to 1).

The controller 20 obtains an input voltage and an output voltage to start a control cycle. Then, based on an input voltage value, an output voltage value, an average output current value, an inductance value, and the like, the length of each period shown in FIG. 7 (referred to as a calculated value) is calculated so that the ideal ZVS can be implemented.

The controller 20 starts executing a control cycle N and executes m switching cycles using a calculated value of each period. Then, in the m-th switching cycle, the polarity (positive or negative) of the inductor current $i_L$ is detected. The detection result is held until a detection timing of the next control cycle N+1. The controller 20 corrects the on-period of the SRSW 11 in the control cycle N+1 based on the detection result of the inductor current polarity in the control cycle N−1. Here, the controller 20 corrects the period $T_{off}$. In addition, the period $T_{dbred}$ and the period $T_{extoff}$ are also corrected.

According to the operation as shown in FIG. 8, a correction of the present disclosure can be performed where the control cycle is the unit of operation. A sufficient amount of time for calculation can be secured when, based on a detection result of the inductor current polarity in the control cycle N−1, a correction is performed in the control cycle N+1 subsequent to the next control cycle. Based on a detection result of the inductor current polarity in a control cycle, a correction may be performed in a control cycle next to the control cycle immediately after the above control cycle, or another control cycle thereafter. In FIG. 8, the inductor current polarity is detected in the m-th switching cycle, but the inductor current polarity may be detected in another switching cycle. Note that by the inductor current polarity being detected in the last m-th switching cycle, more accurate correction can be achieved.

Correction to the period $T_{extoff}$ according to the correction to the period $T_{off}$ enables the ratio, i.e., the duty, between the on-period of the SRSW 11 and the on-period of the CTLSW 12 not to deviate from the calculated value. Correction to the period $T_{dbred}$ according to the correction to the period $T_{off}$ enables maintenance of the resonance period in an appropriate state. That is, when the on-period of the SRSW 11 is corrected, the on-period of the CTLSW 12 is corrected according to the above correction in one preferred embodiment. When the on-period of the SRSW 11 is corrected, the period between when the SRSW 11 is turned off and when the CTLSW 12 is turned on is corrected according to the above correction in one preferred embodiment.

The relationship between the switching cycle for detecting the inductor current polarity and the switching cycle for performing correction to the on-period of the SRSW 11 is not limited to the one described above.

For example, the inductor current polarity may be detected in a switching cycle so that the on-period of the SRSW 11 is corrected in the switching cycle immediately after the above switching cycle. Accordingly, the on-period of the SRSW 11 is promptly corrected based on whether the inductor current is positive or negative detected by the current detector, and thus the response speed can be made higher.

Further, for example, the inductor current polarity may be detected in a switching cycle of a control cycle so that the on-period of the SRSW 11 is corrected in the control cycle immediately after the above control cycle. Accordingly, the on-period of the SRSW 11 in the control cycle immediately after the above control cycle is promptly corrected based on whether the inductor current is positive or negative detected by the current detector, and thus the response speed can be made higher.

A single correction may be done with a minute correction width so that by a repeat of the correction the on-period of the SRSW 11 is corrected with a correction value obtained by accumulation of the minute correction widths. According to this correction method, abnormal operation due to false detection or missed detection is less likely to be done than, for example, when a large correction is performed with a single detection, or when a timing at which an inductor current become zero is directly detected in each switching cycle.

Example 1-1

Figure 9:
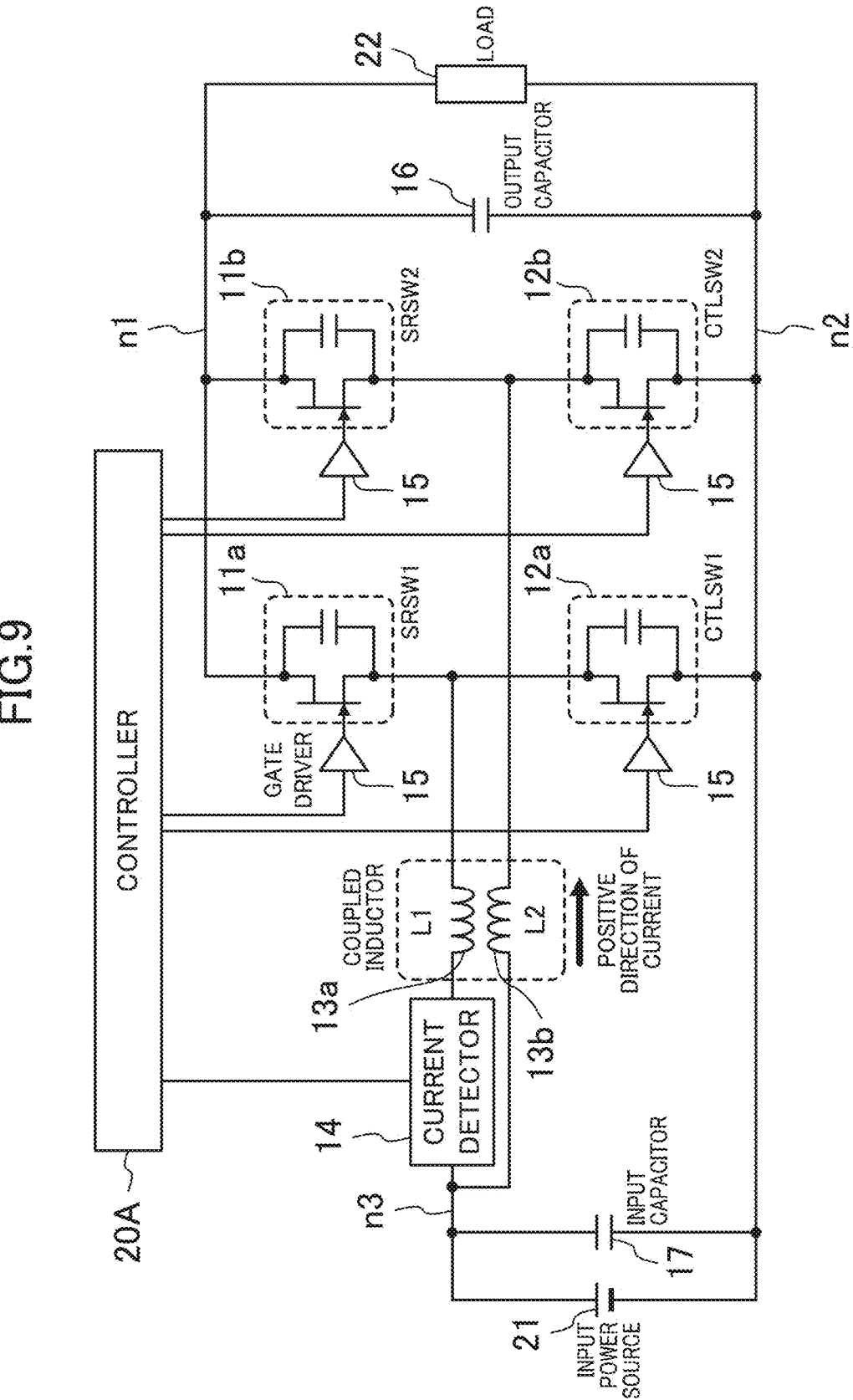
FIG. 9 shows an exemplary configuration of a power conversion device of Example 1-1.

FIG. 9 shows a specific exemplary configuration of a Boost converter using a coupled inductor as a power conversion device of Example 1-1. The exemplary configuration in FIG. 9 includes two phases connected in parallel, where each single phase includes the components of the Boost converter in FIG. 5: the SRSW 11, the CTLSW 12, and the inductor 13. That is, the first phase includes an SRSW1 11a, a CTLSW1 12a, and an inductor L1 13a, and the second phase includes an SRSW2 11b, a CTLSW2 12b, and an inductor L2 13b. The inductor L1 13a and the inductor L2 13b are magnetically coupled inductors. The current detector 14 may be provided in at least one of the two phases. In the configuration example of FIG. 9, only the first phase is provided with the current detector 14.

Figure 10:
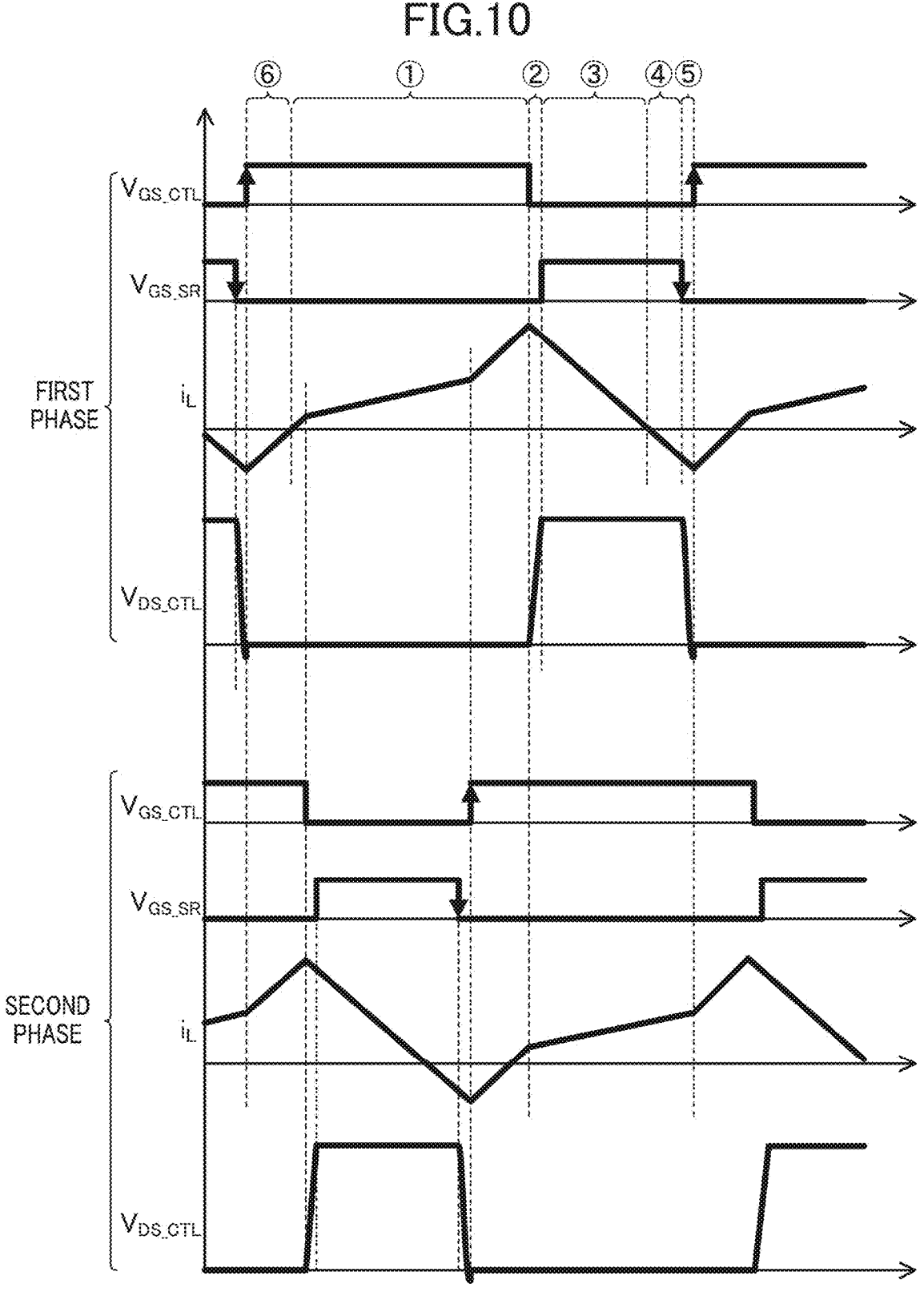
FIG. 10 shows an operation of the power conversion device of Example 1-1 in one switching cycle.

FIG. 10 and FIG. 11 show an operation of the Boost converter of FIG. 9 in one switching cycle in the ideal operation state. The operation waveform of the Boost converter using the coupled inductor varies with the duty or the coupling coefficients. FIG. 10 shows an exemplary operation waveform. FIG. 11 shows an operation of the first phase in one switching cycle. The Boost converter of FIG. 9 performs operation basically in the same way as the Boost converter of FIG. 5. In step (1) (period $T_{on}$), the CTLSW1 12a is on, the SRSW1 11a is off, and a current in the positive direction flows in the inductor L1 13a. In this period $T_{on}$, the inclination of increase in the current varies with the direction of a current flowing in the inductor L2 13b of the second phase. In step (6) (period $T_{extoff}$), the CTLSW1 12a is on, the SRSW1 11a is off, and a current in the negative direction flows in the inductor L1 13a. In this period $T_{extoff}$, the inclination of decrease in the negative current varies with the direction of a current flowing in the inductor L2 13b of the second phase. The operation of the second phase is an operation shifted from the operation of the first phase by a half of the switching cycle.

If a circuit configuration uses a coupled inductor, calculation of a calculated value for each period is more complicated. Thus, it is more difficult to implement high-precision ZVS by calculation alone, and in order to implement such switching, for example, it is necessary to use a microcomputer with a high clock frequency. According to the present embodiment, the autonomous search control leads to an improvement in the accuracy even with approximate control.

Example 2

Figure 12:
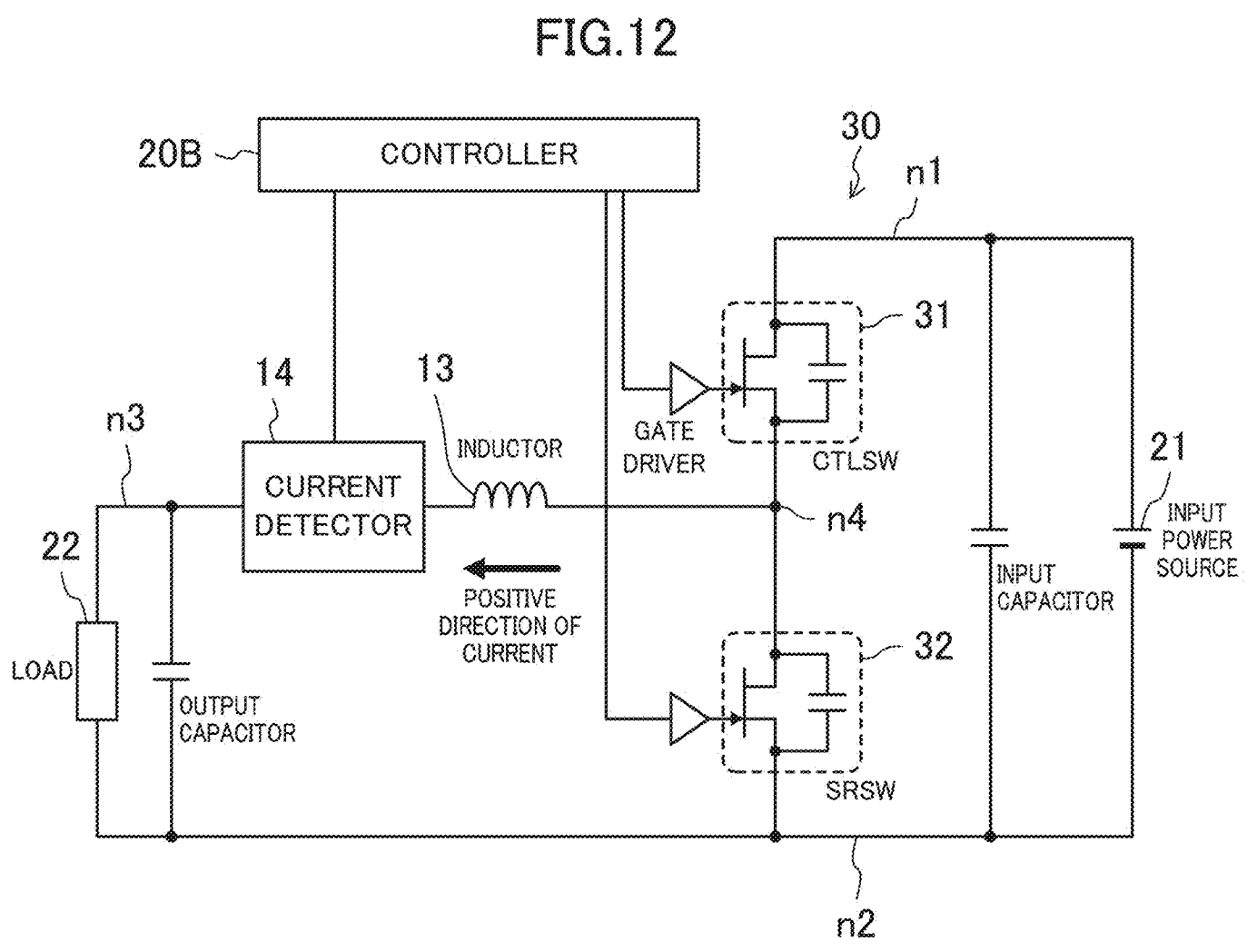

FIG. 12 shows a specific exemplary configuration of a Buck converter (DCDC step-down converter) as a power conversion device of Example 2. In the configuration in FIG. 12, as compared with the Boost converter of FIG. 5, a main circuit unit 30 has a control switch (CTLSW) 31 and a synchronous rectification switch (SRSW) 32 that swap positions with each other. Further, an input power source 21 and a load 22 swap positions with each other. The input power source 21 is connected between a node n1 and a node n2, and the load 22 is connected between a node n3 and the node n2. Here, the positive direction of a current in an inductor 13 is the leftward direction in the drawing, i.e., the direction away from a connection node n4 of the SRSW 31 and the CTLSW 32.

The operation of the Buck converter of FIG. 12 is similar to that of the Boost converter of FIG. 5, and the operations shown in FIG. 7 and FIG. 8 apply as they are. A controller 20B can control the main circuit unit 30 in the same way as the controller 20 of the Boost converter of FIG. 5.

Example 3

Figure 13:
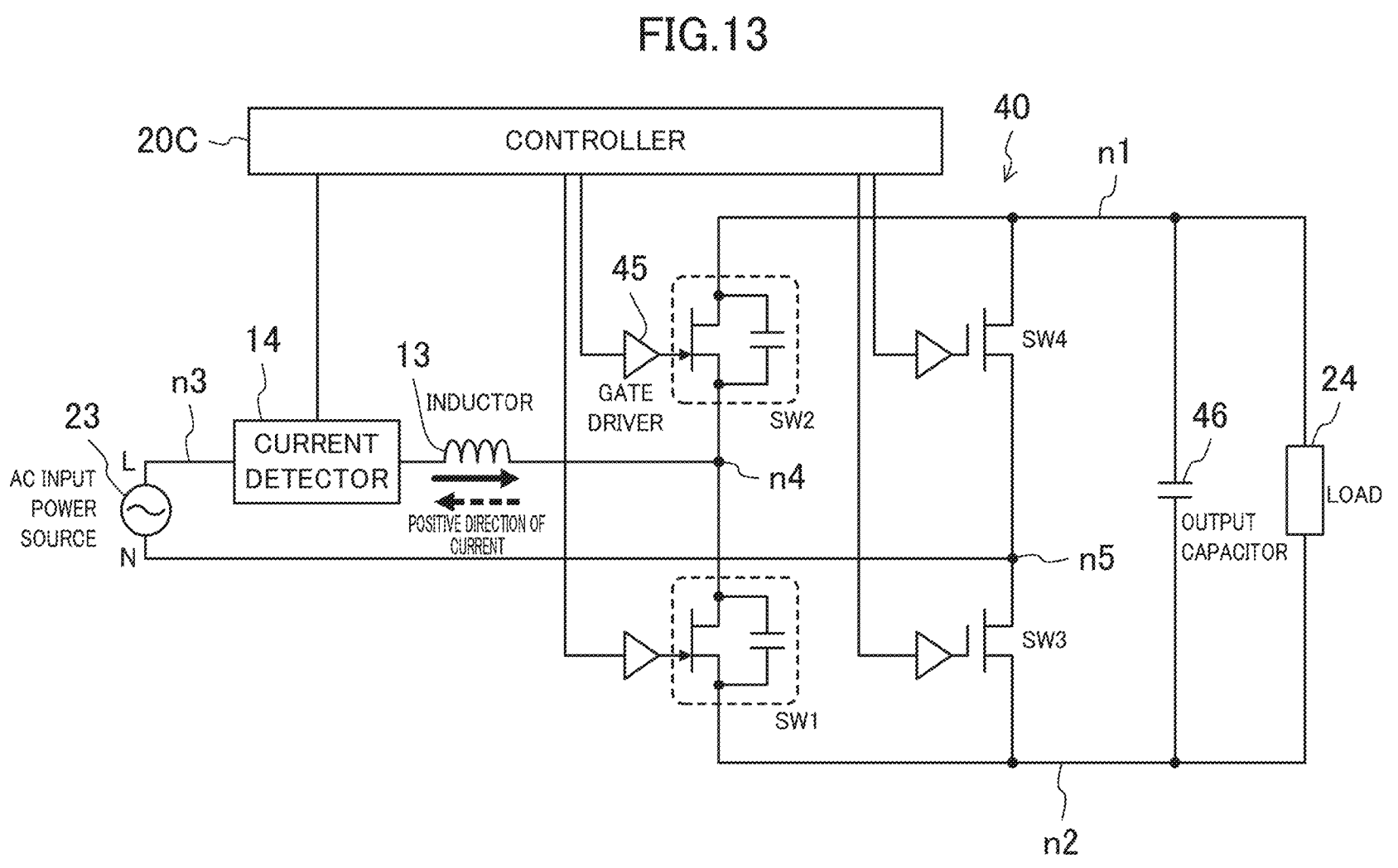

FIG. 13 shows a specific exemplary configuration of a totem pole PFC converter (ACDC converter) as a power conversion device of Example 3. As shown in FIG. 13, in a main circuit unit 40, a switch SW2 and a switch SW1 are connected in series, and a switch SW4 and a switch SW3 are connected in series, between a node n1 and a node n2. Each of the switches SW1 to SW4 is a transistor having a gate terminal, a drain terminal, and a source terminal. The gate terminals of the switches SW1 to SW4 are each connected with a gate driver 45.

An inductor 13 is connected between a node n3 and a connection node n4 of the switches SW1 and SW2. An AC input power source 23 is connected between the node n3 and a connection node n5 of the switches SW3 and SW4. An output capacitor 46 is arranged between the node n1 and the node n2. A load 24 is connected between the node n1 and the node n2.

A controller 20C controls a switching operation of the switches SW1 to SW4 via the gate driver 45. As shown in FIG. 14A, the switches SW1 and SW2 are assigned a CTLSW or an SRSW according to the polarity of the AC input power source 23. The switches SW3 and SW4 are switched between on and off according to the polarity of the AC input power source 23. The main circuit unit 40 is provided with a current detector 14 that detects the direction of a current in the inductor 13. The controller 20C obtains a detection result from the current detector 14 at a predetermined timing. Here, the direction of a current in the inductor 13 is defined according to the polarity of the AC input power source 23 as shown in FIG. 14B.

The controller 20C sets the switches SW1 to SW4 based on the polarity of the AC input power source 23 when starting a control cycle. For example, when the polarity of the AC input power source 23 is L: positive and N: negative, the switch SW1 is assigned to the CTLSW and the switch SW2 is assigned to the SRSW. Further, the switch SW3 is set to on, and the switch SW4 is set to off. In this state, the controller 20C controls the main circuit unit 40 in the same way as the controller 20 of the Boost converter in FIG. 5. When the polarity of the AC input power source 23 is L: negative and N: positive, the switch SW1 is assigned to the SRSW and the switch SW2 is assigned to the CTLSW. Further, the switch SW3 is set to OFF, and the switch SW4 is set to ON. In this state, the controller 20C controls the main circuit unit 40 in the same way as the controller 20 of the Boost converter in FIG. 5.

Example 4

Figure 15:
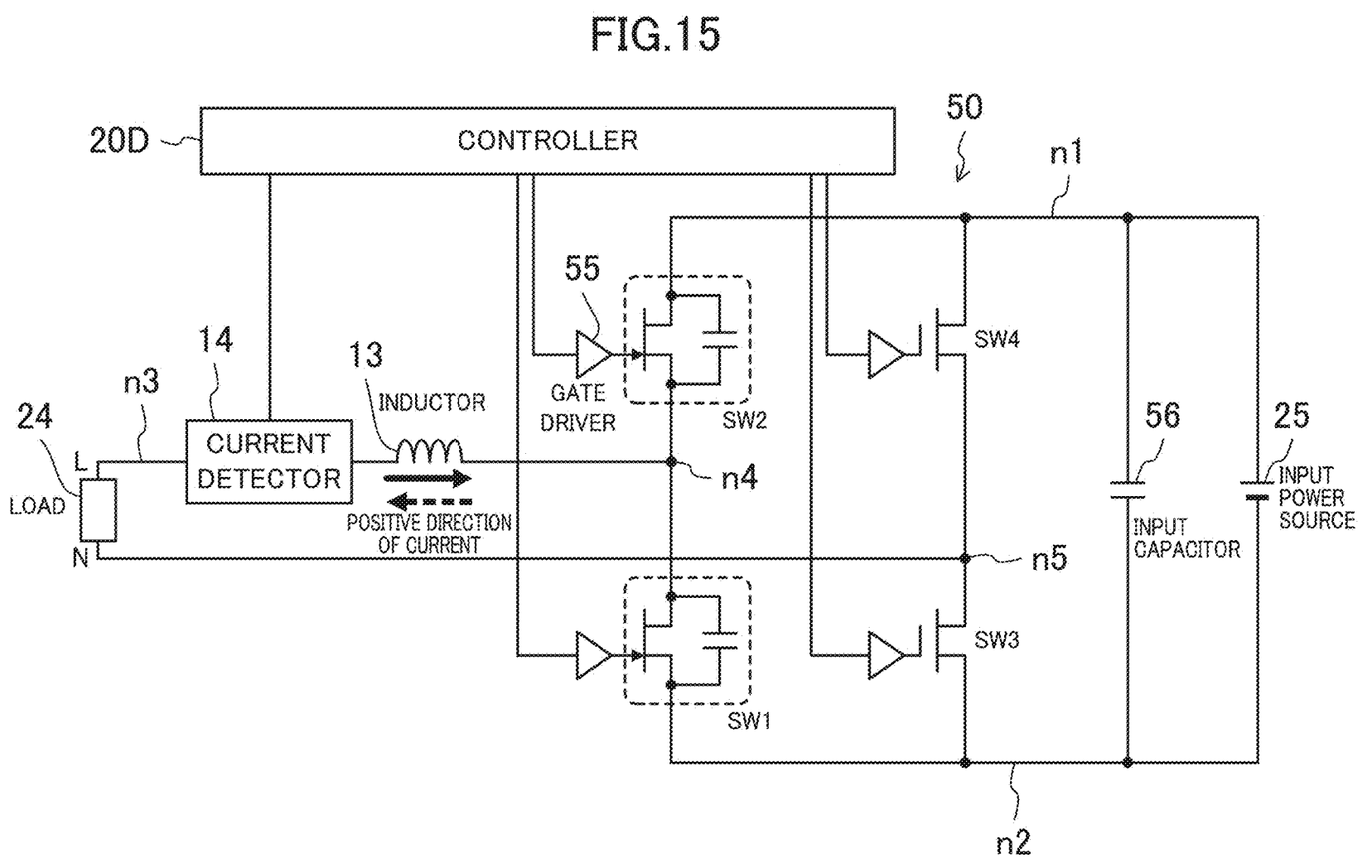

FIG. 15 shows a specific exemplary configuration of an inverter (DCAC converter) as a power conversion device of Example 4. As shown in FIG. 15, in a main circuit unit 50, a switch SW2 and a switch SW1 are connected in series, and a switch SW4 and a switch SW3 are connected in series, between a node n1 and a node n2. Each of the switches SW1 to SW4 is a transistor having a gate terminal, a drain terminal, and a source terminal. The gate terminals of the switches SW1 to SW4 are each connected with a gate driver 55.

An inductor 13 is connected between a node n3 and a connection node n4 of the switches SW1 and SW2. A load 24 is connected between the node n3 and a connection node n5 of the switches SW4 and SW3. An input capacitor 56 is arranged between the node n1 and the node n2. An input power source 25 is connected between the node n1 and the node n2.

The controller 20D controls a switching operation of the switches SW1 to SW4 via the gate driver 55. As shown in FIG. 16A, the switches SW1 and SW2 are assigned a CTLSW or an SRSW depending on the polarity of the AC output voltage to be output. The switches SW3 and SW4 are switched between on and off according to the polarity of the AC output voltage to be output. The main circuit unit 50 is provided with a current detector 14 that detects the direction of a current in the inductor 13. The controller 20D obtains a detection result from the current detector 14 at a predetermined timing. Here, the direction of a current in the inductor 13 is defined according to the polarity of the AC output voltage to be output as shown in FIG. 16B.

The controller 20D sets the switches SW1 to SW4 based on the polarity of the AC output voltage to be output when starting a control cycle. For example, when the polarity of the AC output voltage to be output is L: positive and N: negative, the switch SW1 is assigned to the SRSW and the switch SW2 is assigned to the CTLSW. Further, the switch SW3 is set to on, and the switch SW4 is set to off. In this state, the controller 20D controls the main circuit unit 50 in the same way as the controller 20B of the Buck converter in FIG. 12. When the polarity of the AC output voltage to be output is L: negative and N: positive, the switch SW1 is assigned to the CTLSW and the switch SW2 is assigned to the SRSW. Further, the switch SW3 is set to off, and the switch SW4 is set to on. In this state, the controller 20D controls the main circuit unit 50 in the same way as the controller 20B of the Buck converter in FIG. 12.

As described above, according to the present embodiment, the power conversion device includes a main circuit unit configured to perform a step-up operation or a step-down operation, and the main circuit unit includes a first switch and a second switch connected in series between a first node and a second node, an inductor connected between a third node and a connection node of the first and second switches, and a current detector configured to detect whether the current flowing in the inductor is positive or negative. One of the first and second switches serves as a synchronous rectification switch, and the other one serves as a control switch. In a switching cycle, whether the inductor current is positive or negative is detected by the current detector at a detection timing backed by a predetermined time from a timing at which the synchronous rectification switch switches from on to off. The on-period of the synchronous rectification switch in the subsequent switching cycle is corrected based on whether the inductor current is positive or negative detected by the current detector. Therefore, the power conversion device can undergo autonomous search control for ZVS without a larger circuit area or lower reliability due to a noise effect.

INDUSTRIAL APPLICABILITY

According to the present disclosure, the power conversion device can undergo autonomous search control for ZVS without a larger circuit area or lower reliability due to a noise effect. Therefore, the present disclosure is useful for, e.g., improvement in the performance of the power conversion device.

DESCRIPTION OF REFERENCE CHARACTERS

1 Synchronous Rectification Switch
2 Control Switch
3 Inductor
4 Current Detector
10 Main Circuit Unit
11, 11*a*, 11*b* Synchronous Rectification Switch
12, 12*a*, 12*b* Control Switch
13, 13*a*, 13*b* Inductor
14 Current Detector
20, 20A, 20B Controller
30 Main Circuit Unit

13

31 Control Switch
32 Synchronous Rectification Switch
40 Main Circuit Unit
50 Main Circuit Unit
141 Shunt Resistor
SW1 to SW4 Switch
n1 First Node
n2 Second Node
n3 Third Node

The invention claimed is:

1. A power conversion device, comprising:
a main circuit unit configured to perform a step-up operation or a step-down operation; and
a controller configured to control an operation of the main circuit unit, wherein
the main circuit unit includes
a first switch and a second switch connected in series between a first node and a second node,
an inductor connected between a third node and a connection node of the first and second switches, and
a current detector configured to detect whether a current flowing in the inductor is positive or negative,
the controller is configured to
define one of the first and second switches as a synchronous rectification switch, define the other one of the first and second switches as a control switch, and define a positive direction of an inductor current,
perform, in each switching cycle, an operation of turning the control switch on and afterward off while the synchronous rectification switch is off, and then turning the synchronous rectification switch on and afterward off while the control switch is off,
obtain, in a first switching cycle, a detection result from the current detector at a detection timing backed by a predetermined period from a timing at which the synchronous rectification switch switches from on to off, and
correct, based on whether the inductor current is positive or negative indicated by the detection result, an on-period of the synchronous rectification switch in a second switching cycle after the first switching cycle.

2. The power conversion device of claim 1, wherein
the controller sets, as the predetermined period, a period in which the inductor current is expected to become zero at the detection timing in an ideal operation state.

3. The power conversion device of claim 2, wherein
the controller calculates the predetermined period using an input voltage value and an output voltage value of the power conversion device; an inductance value of the inductor; and a parasitic capacitance value of the first switch and a parasitic capacitance value of the second switch.

4. The power conversion device of claim 1, wherein
the controller lengthens the on-period of the synchronous rectification switch when the detection result indicates that the inductor current is positive, and shortens the on-period of the synchronous rectification switch when the detection result indicates that the inductor current is negative.

5. The power conversion device of claim 1, wherein
when correcting the on-period of the synchronous rectification switch, the controller corrects the on-period of the control switch according to the correction to the on-period of the synchronous rectification switch.

6. The power conversion device of claim 1, wherein
when correcting the on-period of the synchronous rectification switch, the controller corrects the period between when the synchronous rectification switch is turned off and when the control switch is turned on, according to the correction to the on-period of the synchronous rectification switch.

7. The power conversion device of claim 1, wherein
the current detector includes a shunt resistor connected in series with the inductor, and is configured to detect whether the inductor current is positive or negative based on a voltage at both ends of the shunt resistor.

8. The power conversion device of claim 1, wherein
the second switching cycle is a cycle immediately after the first switching cycle.

9. The power conversion device of claim 1, wherein
the controller performs an operation according to a control cycle including m switching cycles, where m is an integer greater than or equal to 1,
obtains, in any switching cycle in a first control cycle, a detection result from the current detector at the detection timing, and
corrects, based on whether the inductor current is positive or negative indicated by the detection result, the on-period of the synchronous rectification switch in a second control cycle after the first control cycle.

10. The power conversion device of claim 9, wherein
the second control cycle is a control cycle immediately after the first control cycle.

11. The power conversion device of claim 9, wherein
the second control cycle is a control cycle next to the control cycle immediately after the first control cycle, or another control cycle thereafter.

12. A control method of a power conversion device, wherein
the power conversion device includes a main circuit unit configured to perform a step-up operation or a step-down operation, and
the main circuit unit includes
a first switch and a second switch connected in series between a first node and a second node,
an inductor connected between a third node and a connection node of the first and second switches, and
a current detector configured to detect whether a current flowing in the inductor is positive or negative,
the control method includes
defining one of the first and second switches as a synchronous rectification switch, defining the other one of the first and second switches as a control switch, and defining a positive direction of an inductor current,
performing, in each switching cycle, an operation of turning the control switch on and afterward off while the synchronous rectification switch is off, and then turning the synchronous rectification switch on and afterward off while the control switch is off,
obtaining, in a first switching cycle, a detection result from the current detector at a detection timing backed by a predetermined period from a timing at which the synchronous rectification switch switches from on to off, and
correcting, based on whether the inductor current is positive or negative indicated by the detection result, an on-period of the synchronous rectification switch in a second switching cycle after the first switching cycle.

* * * * *